April 9, 1963

D. LABINO 3,084,392

METHOD FOR PRODUCING A GASEOUS BLAST
AND FOR PRODUCING GLASS FIBERS

Filed April 2, 1958

INVENTOR.
Dominick Labino
BY
Nobbe & Swope
ATTORNEYS

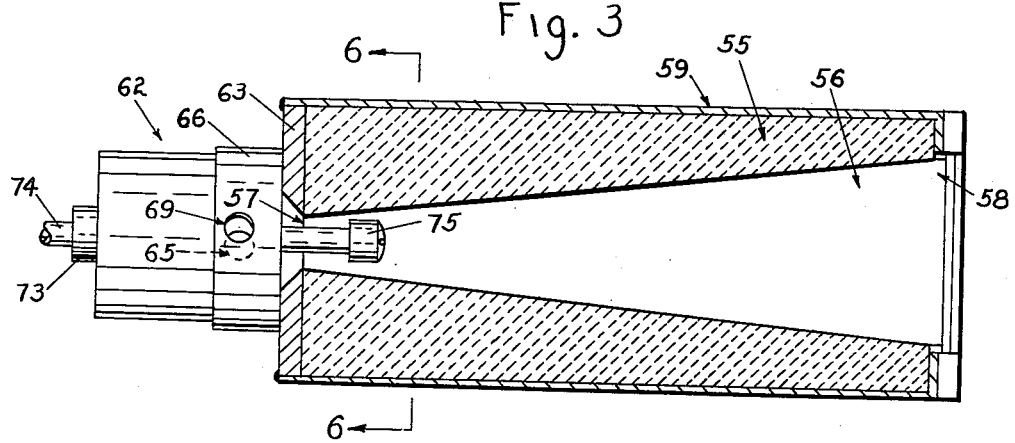
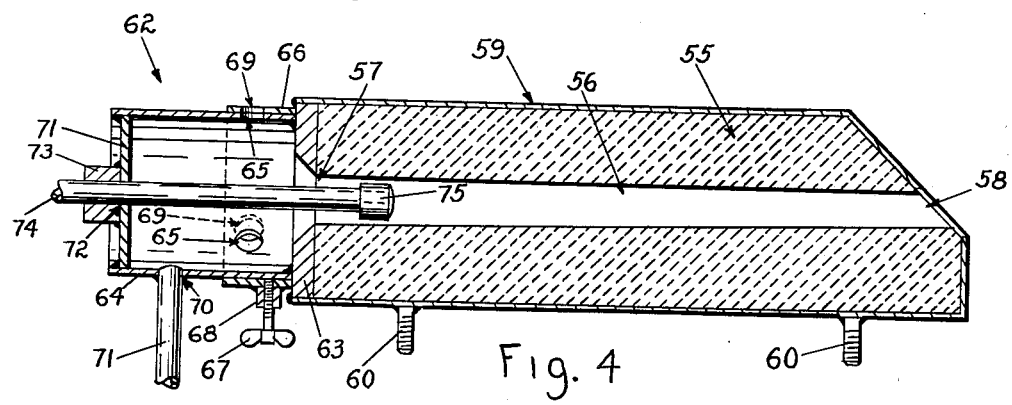
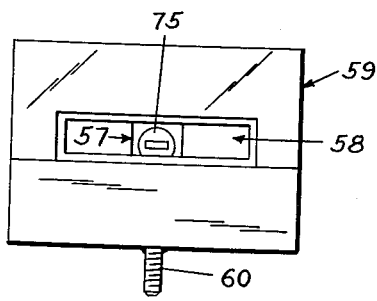
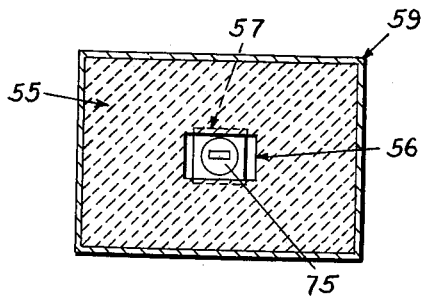

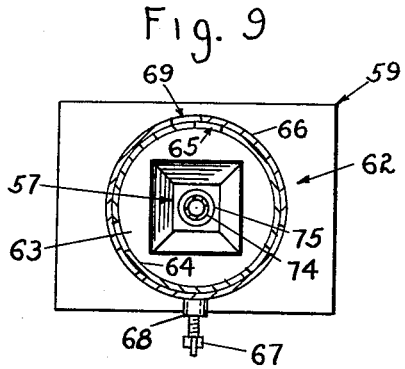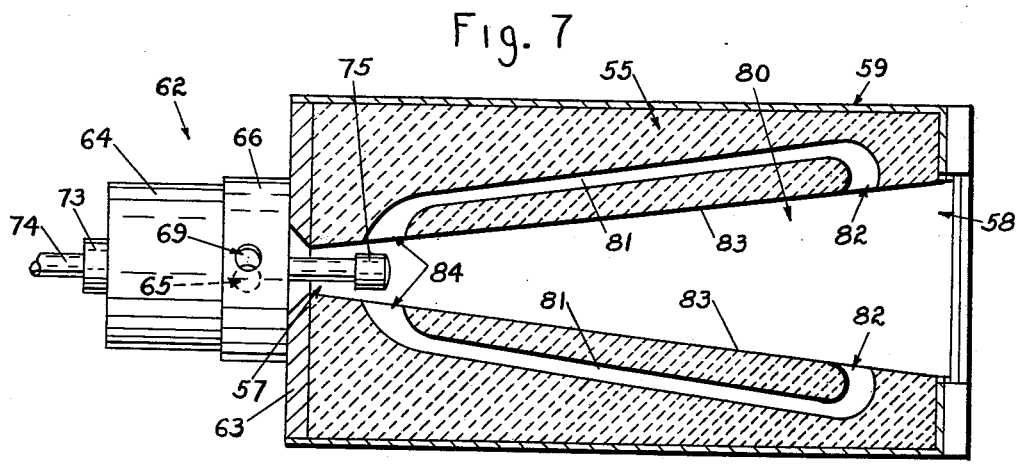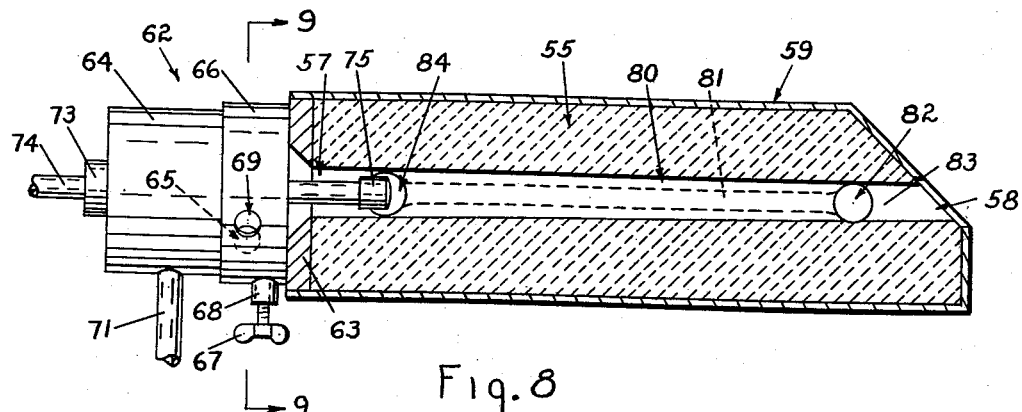

United States Patent Office 3,084,392
Patented Apr. 9, 1963

3,084,392
METHOD FOR PRODUCING A GASEOUS BLAST AND FOR PRODUCING GLASS FIBERS
Dominick Labino, Grand Rapids, Ohio, assignor, by mesne assignments, to Johns-Manville Fiber Glass Inc., Cleveland, Ohio, a corporation of Delaware
Filed Apr. 2, 1958, Ser. No. 725,855
8 Claims. (Cl. 18—47.3)

This invention relates to the production of fibers from heat softenable materials and more particularly relates to the production of glass fibers by the flame attenuation of primary glass filaments.

In a further aspect this invention relates to a novel burner structure for use in the production of glass fibers by the flame attenuation of primary glass filaments.

In a still further aspect this invention relates to a method of producing a mat of glass fibers of high coherency and high tensile strength consisting of a plurality of glass fibers of relatively long length and the bodies of which are of undulating character whereby said fibers are held in felted contacting relation with each other in a highly tenacious relationship.

In another aspect this invention relates to a novel method for producing a gaseous blast of intense heat and of relatively high velocity, adapted to produce glass fibers of high coherency and high tensile strength when in mat form, which fibers are of relatively long length and of undulating character because the intensity of the heat of the blast is relatively greater than the velocity of the blast.

One present method of producing glass fibers of the wool type comprises providing a body of molten glass, and withdrawing a stream of glass from the molten body, and solidifying the stream to form a rod. Thereafter an advancing end of the solidified rod is subjected to a gaseous blast of intense heat and velocity. The advancing end of the glass rod is rendered molten by the intensity of the heat of the blast and the velocity of the blast is thereafter effective to draw out and attenuate the molten end of the rod into a very fine fiber. Thus fibers having diameters in the range from 1 micron or less, and larger, and lengths from 1/16 inch and upwards are readily produced in this manner.

The fibers are suitably collected on a moving foraminous belt by the aid of a device for reducing atmospheric pressure in the vicinity of the collection belt, to form a mat. The mat may then be subjected to further use as desired, such as for home insulation or the like.

It is to be noted that the fibers so produced are very short; and mats produced from such fibers have low coherency and tensile strength.

It is therefore an important object of the present invention to provide a novel burner structure which is adapted to produce a gaseous blast of intense heat and of relatively high velocity which is adapted for the production of glass fibers of the wool type which are of relatively long length and the bodies of which are undulatory character which are held in felting relationship with each other in highly tenacious relationship.

Another important object is to provide a burner structure which is readily fabricated from refractory blocks, and having a combustion space of free-flow configuration adapted for the production of a gaseous blast of intense heat and of relatively high velocity which is adapted for use in the production of wool-type fibers from glass and other similar heat-softenable materials.

Another object is to provide a burner structure having a combustion space with a recycle passage for admixing partially burned gases of combustion with a raw combustible gas to provide a gaseous blast of high temperature and of relatively high velocity which is adapted for use in the production of wool-type glass fibers of relatively long length and the bodies of which are undulatory character.

A further important object is to provide a mass of glass fibers, the bodies of which are of relatively long length and the bodies of which are undulatory character.

A further object of the invention is to provide glass fibers which are held in felting relationship with each other in a highly tenacious manner.

Another object is to provide a process for producing glass fibers by subjecting at least one advancing end of at least one glass rod to a gaseous blast in which the temperature of the blast is sufficiently great to melt the rod at a rater greater than the rate of attenuation produced by the velocity of the blast to form the rod into relatively long undulating fibers before the same are severed from the glass rod.

Another object is to provide a novel method of producing a blast of gaseous combustion products of high velocity and intense heat which is adapted to use in the production of fibers from heat softenable materials such as glass.

Other objects and advantages of the invention will become more apparent during the course of the following description when taken in connection with the accompanying drawings.

In the drawings wherein like numerals are employed to designate like parts throughout the same:

FIG. 3 is a horizontal sectional view of the burner structure of FIG. 2;

FIG. 4 is a vertical sectional view of the burner structure of FIG. 2;

FIG. 5 is a front elevational view of the burner structure of FIGS. 2, 3 and 4;

FIG. 6 is a sectional view taken along the line 6—6 of FIG. 3;

FIG. 7 is a horizontal sectional view of a second embodiment of the burner structure of the present invention;

FIG. 8 is a vertical sectional view of the second embodiment of the invention, also shown in FIG. 7; and FIG. 9 is a sectional view taken along the lines 9—9 of FIG. 8.

Figure 1:
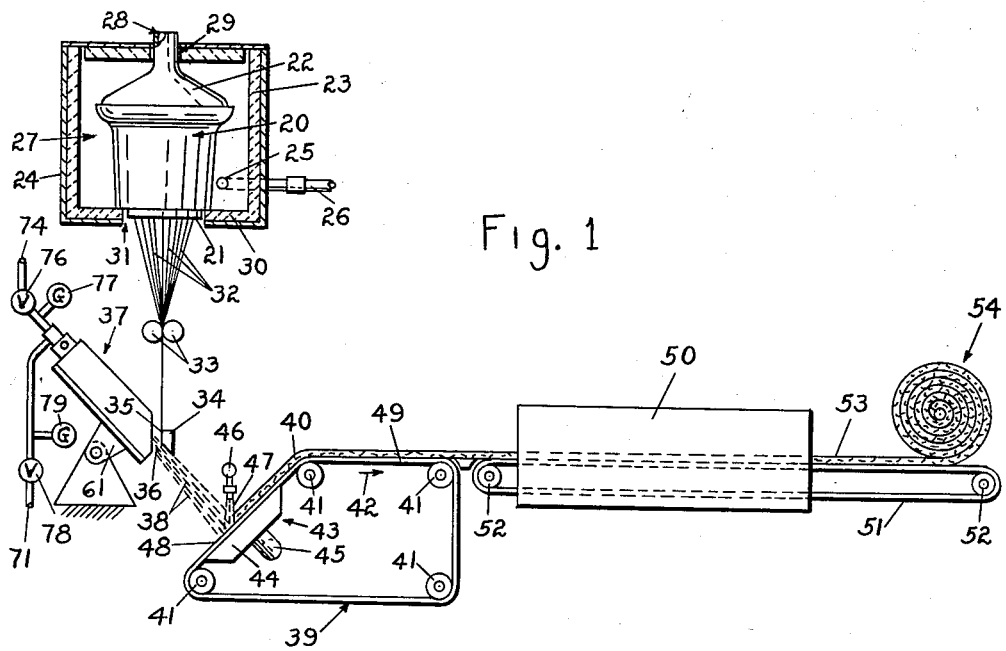
FIG. 1 is a schematic view with some parts in section of apparatus adapted for the production of glass fibers utilizing the burner structure of the present invention.

As shown in FIG. 1 the apparatus adapted to the production of glass fibers utilizing the burner structure of the present invention includes a glass melting chamber 20. This chamber is heated by means of gaseous combustion products, and provides the means whereby a body of molten glass can be produced, from which a primary glass filament can be formed and from which filament, through use of the burner structure of invention, fine glass fibers can be produced.

The glass melting chamber 20 includes a base 21 of generally cylindrical shape and a cover 22 therefor which is of conical shape. The melting chamber is suitably fabricated of a high temperature resistant refractory clay and is enclosed within a refractory casing 23. The refractory casing is supported in space on a suitable frame, not shown, around the glass melting chamber by means of a thin metal shell 24.

An opening 25 is provided through the metal shell and the refractory casing adjacent the base thereof and into such opening there is inserted a gas conduit 26 for the introduction of a combustible gaseous mixture through the wall of the refractory casing.

The melting chamber is of somewhat smaller diameter than the surrounding refractory casing and thereby an annular combustion space 27 is provided between the outside surface of the wall of the melting chamber and inside surface of the wall of the refractory casing. A combustible gaseous mixture, such as natural gas and air, is introduced via gas conduit 26 and is burned in the annular combustion space 27. Thereby heat is applied to the walls of the glass melting chamber 20 to melt glass increments introduced into the melting chamber through an opening 28 provided in the cone-shaped cover 22. Exhaust gases are vented out through the top of the refractory casing through an appropriate vent hole 29.

The refractory casing 23 is provided in its base 30 with a circular opening 31 of somewhat smaller diameter than the base of the melting chamber and the melting chamber is positioned thereon in coaxial alignment whereby streams of glass exuded from small orifices in the base of the melting chamber can pass downwardly in unrestricted flow.

As previously mentioned the base of the melting chamber is provided with a plurality of small orifices formed in circular array adjacent the perimeter thereof. Through these small orifices, glass which is rendered molten in the interior of the melting chamber, is exuded as small streams. These small streams radiate their heat to the atmosphere and thus become solidified into rods, or primary filaments 32.

The primary filaments are gathered and directed between a pair of rubber covered pull rolls 33 whereby they are pulled downwardly. The pull rolls thus provide the attenuating force and proper speed for forming primary filaments 32 of desired diameter. The primary filaments are directed downwardly behind a guide block 34 which is provided on its rear face 35 with a plurality of vertically disposed parallel aligned guide grooves (not shown), into which the primary filaments 32 are fitted and thereby retained in proper alignment for presentation to a hot gaseous blast 36.

Rearwardly of the guide block there is positioned the burner structure 37 of the present invention, which is adapted to produce a gaseous blast of intense heat and of relatively high velocity and direct such blast adjacent and beneath the guide block to contact the advancing ends of the primary filaments produced from above.

The intense heat of the blast produced by the burner is effective to melt the advancing ends of the primary filaments sufficient for attenuation. The relatively high velocity of the blast is effective to draw out and attenuate the molten advancing ends and thereby form glass fibers 38 of high coherency and high tensile strength which are of relatively long length and the bodies of which are of undulating character whereby said fibers when in mat form are held in felted contacting relation with each other in a highly tenacious relationship.

The fibers are carried by the blast 36 to a foraminous fiber collection belt 39 and collected thereon as a mat 40. The belt is supported upon a plurality of rollers 41, one or more of which is adapted to be powered by a source such as an electric motor not shown. The belt is thereby moved at a selected speed in a required direction, as indicated by the arrow 42 of FIG. 1.

An atmospheric pressure reducing device 43 is positioned behind the collecting flight of the foraminous collecting belt 39 in alignment with the gaseous blast 36 proceeding to the belt from the burner 37. This pressure reducing device may suitably take the form of a sheet metal hood 44, or shroud, connected with a conduit 45 leading to a suction device such as a pneumatic fan (not shown). All parts of this equipment are of course connected in gas-tight relationship to provide proper operating efficiency. The gases of the blast 36 are drawn into the hood, through the belt, and the fibers 38 are collected on the surface of the collecting belt.

At a point adjacent the place where the fibers are collected a spray nozzle 46 is provided for directing a spray of liquid binder 47, if desired, on the fibers to coat their surfaces to aid in adhering them into a mat of desired properties.

As the belt 39 moves in the direction of the arrow of FIG. 1, and the fibers collect thereon, the mat 40 is gradually accumulated and formed on the collecting flight 48 and is withdrawn from the point of collection at a rate commensurate with formation to provide a mat of given ultimate thickness.

The mat 40 proceeds to the effluent flight 49 of the collecting belt and is removed therefrom and directed into an oven 50 wherein the previously applied binder is cured to a hard solid state and thereby the structure of the mat is stabilized.

The oven 50 is heated by any suitable means such as gas burners to provide the requisite temperature for binder curing. The oven is provided with a movable chain 51 to support the mat. The chain is retained at its ends by rotatable rolls 52, one of which may be powered to drive or move the chain through the oven at a speed synchronized with the speed of the fiber collecting belt 39 previously referred to. As the finished mat 53 emerges from the curing oven, it can be suitably rolled as at point 54 for transportation to subsequent processing operations.

Figure 2:
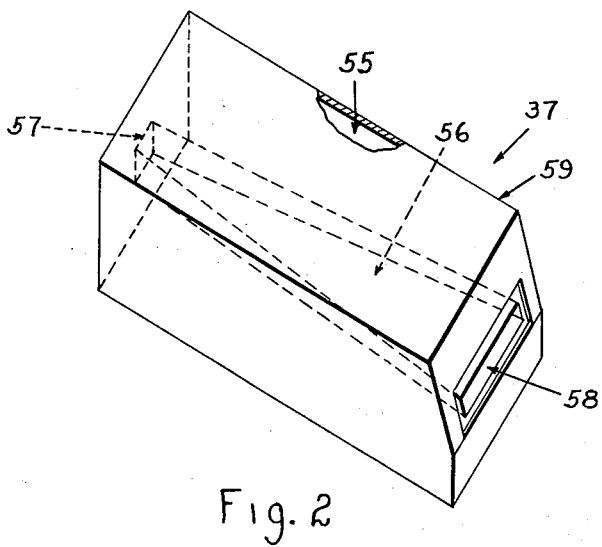
FIG. 2 is a perspective view of a preferred embodiment of the burner structure of the present invention.

The burner structure of this invention as utilized in the aforedescribed process and apparatus is shown in perspective view by FIG. 2. In general it includes a refractory block 55 of approximately square section and elongated rectangular shape, having a free-flow combustion chamber 56 formed therein and extending from one end to the other. The combustion chamber begins at the rear end of the refractory block at an inlet port 57 and terminates at the other end in an exhaust port 58. The inlet port is suitably of square shape. The outlet port is at least as large in area as the inlet port. The outlet port is suitably of elongated rectangular shape.

The embodiment of FIG. 2 is shown more particularly in FIGS. 3, 4, 5 and 6. As shown in the horizontal sectional view of FIG. 3, the refractory block 55 contains therein, proceeding from one end thereof to the other, a free-flow combustion chamber which begins at the entrance end in square section and terminates at the outlet end as an elongated rectangular exhaust opening, or port 58. Thus the exhaust port is adapted to produce a flat wide flame for contacting the advancing ends of the primary filaments 32 referred to above, as produced in FIG. 1.

The refractory block 55 is contained within a thin metal casing 59 by which it is supported in space. The casing surrounds the top, bottom and sides of the refractory block and also the exit end thereof with the exception of the exhaust port. On the bottom side the metal support casing is provided as shown in FIG. 4 with a pair of threaded studs 60 which may be attached to suitable cooperating supporting members as on a tilt frame 61 shown in FIG. 1.

A gaseous combustion mixture is introduced into the free-flow combustion chamber 56 of the refractory block by means of a fuel injection device 62 positioned adjacent the inlet port of said free-flow combustion chamber. The entrance end of the refractory block is faced with a metal plate 63 secured at its periphery as by welding to the metal support casing 59 surrounding the sides, top and bottom of the refractory block. The combustible gas induction apparatus 62 is secured to this metal facing in coaxial alignment for injecting a gaseous fuel combustion material into the free-flow combustion chamber.

The gas induction apparatus 62 includes a tubular gas manifold 64 positioned in coaxial alignment to the entrance port 57 of the free-flow combustion chamber and welded at its forward end to secure it to the aforementioned metal facing plate 63. The forward end of the gas manifold is provided with spaced holes 65 around the periphery thereof and a shroud or sleeve 66, also of tubular structure and mating relation with the outside diameter of the gas manifold, is positioned in slidable relation thereon. A set screw 67 is inserted through a threaded boss 68 provided on this outer sleeve and thereby an adjusted position can be fixed between the outer sleeve and the gas manifold, upon which it rests.

The slidable sleeve previously referred to, has orifices 69 therein adapted to mate with the orifices 65 of the gas manifold, and is the means whereby secondary air is admitted and admixed with the pure gas introduced into the gas manifold.

The gas manifold is provided with an aperture 70 at the rearward end thereof into which a tubular conduit 71 is connected for introducing a pure combustible gas thereinto.

The rear end of the gas manifold is closed by a circular metal plate 91 welded around its periphery to the inside wall of the manifold 64. This metal plate is provided with an aperture 72, coaxial to the manifold. A tubular support sleeve 73, having an inside diameter the same as the aperture 72, is welded to the metal plate in coaxial alignment.

A primary air jet comprising a tubular conduit 74 terminating in a spud 75 is slidably fitted into the sleeve 73 and aperture 72 for introducing primary air into the inlet end of the free-flow combustion chamber 56. The head, or spud end, of the air injector tube 74 is passed through the inlet port of the free-flow combustion chamber and positioned in aspirating relationship therein. A slight amount of clearance, provided between the support sleeve and the tubular primary air inlet allows the spud to be slidably positioned in the free-flow combustion chamber at a most advantageous point for maximum induction of the combustible gas thereinto.

In operation, primary air is introduced into the free-flow combustion chamber through the air conduit 74 and spud 75 at a pressure up to about 100 pounds per square inch gauge, and the gas is introduced at zero pressure gauge, being supplied at a rate commensurate with the rate of introduction of primary air to provide a stable flame.

Suitable adjustment of the secondary air is provided after the primary air is started and gas is turned on and ignited to provide a stable flame.

To start the burner, a small amount of primary air is turned on and then gas is admitted, which is drawn into the combustion chamber by aspiration of the primary air and mixed with the primary air and ignited. The internal walls of the free-flow combustion chamber are allowed to heat to approximately a red heat and then the air and gas are gradually increased with concomitant adjustment of the secondary air, to provide a flame issuing from the exhaust port at an extremely high temperature and relatively high velocity.

Referring again to FIG. 1, after having described the operation of the burner, it will be seen that the burner shell is positioned upon a tilt frame 61 so that the gaseous blast produced thereby can be adjusted critically for direction beneath the guide block. The primary air conduit of the burner is provided with a valve 76, and the inlet air pressures are indicated by a suitable gauge 77 connected with the primary conduit. Similarly the gas inlet, or conduit 71, is provided with a control valve 78 and a gauge 79 whereby the flow of gas can be carefully controlled.

A second embodiment of the burner of invention utilizing a free-flow re-circulating combustion chamber 80 is shown in FIGS. 7, 8 and 9. This structure is generally similar in configuration to that previously described for the preferred embodiment as shown in FIGS. 2 to 6. However, the free-flow combustion chamber is of somewhat different configuration than that of the preferred embodiment in that it includes, as mentioned before, one or more recirculating gas passages 81 adapted to recycle partially burned combustion gases from a point adjacent the outlet end of the free-flow combustion chamber 80 to a point adjacent the inlet end of such free-flow combustion chamber.

As best shown in FIG. 7 a return, or recycle, gas passage 81 is provided in the refractory in planar alignment with the free-flow combustion chamber 80. The recycle gas passage has an inlet opening 82 formed in the side wall 83 of the free-flow combustion chamber adjacent the outlet of the free-flow combustion chamber. This inlet blends with the recycle passage which extends through the refractory block separately from the free-flow combustion chamber and terminates in a recycle passage outlet opening 84. The recycle passage outlet is also positioned in the side wall of the free-flow combustion chamber and adjacent the inlet of the chamber.

A similar recycle passage is shown formed on the other side of the free-flow combustion chamber. This duplicate recycle passage is also effective to re-circulate gaseous combustion materials back to a point adjacent the entrance end of the burner structure.

The entrance and outlet openings of the recycle passages are suitably, as shown in FIG. 8, of circular configuration. However, it is to be understood that these may be of other shapes adapted to the pick-up and recycle of gases at desired rates.

As shown in FIGS. 7 and 8, the spud of the primary air jet is positioned adjacent the point where the outlet openings of the recycle passages terminate in the side walls of the free-flow combustion chamber to provide a point of low pressure whereby the partly burned gases are re-cycled and mixed with the incoming gases; thereby applying heat thereto.

The combustible gas inducing apparatus for this embodiment of the invention is substantially the same as that as shown in FIGS. 3 and 4. As shown in FIG. 5, which is a front elevational view of the burner of FIGS. 2, 3 and 4, the air injection spud is coaxial to the inlet opening of the free-flow combustion chamber. This same alignment of parts is also evident from an examination of FIG. 6 which is a section view taken along the line 6—6 of FIG. 3. When so operating it will be obvious that gas and secondary air are readily pulled into the free-flow combustion chamber inlet because of the clearance between the walls of the inlet and the outer surfaces of the primary air induction tube and its associated spud.

FIG. 9 is a section view taken along the line 9—9 of FIG. 8 and shows a view coaxially looking into the inlet opening of the free-flow combustion chamber of the embodiment of the invention shown in FIGS. 7 and 8. This view is taken from the entrance end of the free-flow combustion chamber and shows the secondary air adjustment sleeve with the air passages therein partially overlapping corresponding air passages in the gas introduction manifold. Both of these units are placed in surrounding relationship and in coaxial alignment to the inlet opening of the free-flow gas passage.

Like FIGS. 5 and 6, this view also shows the spud associated with the primary air injection tube, positioned coaxially within the inlet opening of the free-flow combustion chamber. Thus secondary air and induced combustible gas are readily admitted into the free-flow combustion chamber for combustion in the space between the outer surfaces of the primary air induction tube and the walls of the free-flow combustion chamber.

The following examples are illustrative of burners fabricated according to the present invention and more fully explain the inventive concept.

*Example I*

A burner was fabricated as shown in the embodiment of FIGS. 2 to 6 wherein the inlet port had an area of one square inch, with the height and width each being one inch to form a square.

The outlet port had an area of 1.75 inches, having a height of ½ inch and a width of 3.5 inches.

The length of the free-flow combustion chamber was nine inches.

Example II

A burner was fabricated according to the embodiment of Example I except that the length of the free-flow combustion chamber was 18 inches.

Example III

A burner was fabricated according to the embodiment of FIGS. 7 and 8 wherein the inlet port had an area of one square inch, with the height and width each being one inch to form a square.

The outlet port had an area of 1.75 inches, having a height of ½ inch and width of 3.5 inches.

The length of the free-flow combustion chamber was nine inches.

The average area of the recycle gas passages was ⅛ square inch, having a height of about ½ inch and a width of about ¼ inch.

As previously mentioned, primary air pressures may range up to 125 pounds per square inch gauge or more. However, preferred primary air operating pressures will be in the range from about 60 to about 100 pounds per square inch gauge.

The gas, as also previously mentioned, is introduced at zero gauge pressure, and is supplied at a rate commensurate with the rate of introduction of primary air to provide a stable flame.

Also a suitable adjustment of the secondary air is provided to secure a stable flame.

In operating the present burner it is necessary that the inside of the free-flow combustion chamber be brought up to a temperature in the range from 2500–2800° F. for optimum operation. Adjustments of the gas and air mixture are thereafter less critical and substantial changes of the position of the air spud in the combustion chamber can be made and yet produce a stable flame.

Temperatures produced by the gaseous blast of the present burner are substantially in excess of 2800° F.

Velocities of the gaseous blast produced by the present burner as measured by pressure of the blast at the outlet opening of the burner range up to about 20 ounces per square inch. A preferred operation for the production of fibers of an average diameter of about 3 microns utilizes a blast velocity as measured by blast pressure of about 5 ounces per square inch.

The exact reason why a blast of such high temperature and of such a relatively high velocity is produced is not fully understood, particularly having in mind that the velocity of the blast is well beyond the rate of flame propagation of ordinary fuel gas. However, it is believed that combustion of the mixture of secondary air and gas, which is moving at a considerably slower velocity than the primary stream of air, takes place partially prior to contact between the combustible mixture and the primary air and thus combustion is begun prior to contact of the mixture with the high velocity air.

More specifically, the amount of secondary air entrained is insufficient to completely consume all of the gas so that initial combustion within the refractory lined tunnel takes place with a deficiency of air. Since the combustible mixture is being drawn into the tunnel by the movement of the primary air, contact between the two takes place after the combustible mixture begins burning and the additional air, to further complete combustion, is obtained from the primary stream of air. The volume of air in the primary stream, the volume of secondary air, and the volume of fuel gas is controlled so that sufficiently complete combustion takes place within the refractory lined tunnel that the core of the blast issuing from the burner mouth will not be appreciably colder than the outer regions of the blast and thus chill the glass filaments.

The modification of the invention shown in FIG. 7 has been found to produce some extraordinarily high temperatures, higher than those produced by the combustion of ordinary fuel gas.

Again the exact reason as to why this occurs is not fully understood. However, it is believed that by subjecting the incoming mixture of gaseous fuel and air to the high temperature gases of combustion which are recirculated by the recycle channels 81, the fuel gas may be thermally cracked for example into acetylene, perhaps some hydrogen and perhaps some carbon. Of these materials, acetylene and hydrogen are known to have an extremely high rate of flame propagation and also have combustion temperatures approaching 4000° F. When these products of thermal cracking subsequently come into contact with the primary air stream issuing from the primary air spud, the products of cracking, namely acetylene, hydrogen and carbon are completely oxidized by combination with the primary air and secondary air to produce the resulting unexpectedly high temperatures.

Another possible reason why the unexpectedly high temperatures are produced by the present invention may be the formation of aldehydes as partial oxidation products where the oxygen poor combustion mixture contacts the recirculated, high temperature gases of combustion prior to contact with the primary air stream. It is known that aldehydes are further oxidized at extremely high temperatures with the resultant production of carbon dioxide. Such oxidation is known to occur at an extremely rapid rate and of course the oxidation releases large quantities of heat energy, thus possibly contributing to the very high temperatures and velocities encountered herein.

An advantage of the present burner is that there is no high frequency whistle produced. This is particularly desirable to workmen who tend the present burners and labor in the vicinity of equipment utilizing such burners.

It should also be pointed out that an apparently phenomenal amount of gas, by comparison, can be burned per unit volume by the present burner. A figure of 200 therms per cubic foot per hour has been recorded.

The configuration of the free-flow combustion chamber is such that the inlet port and outlet port are at least equal in area. Thus there is no restriction for the exhausting of combustion gases from the burner. In fact it is generally preferred when using the present burner that the outlet port be somewhat larger in area than the inlet port. In general the area of the outlet port should be from about 10% to 75% greater than the area of the inlet port.

It does not appear that the length of the free-flow combustion chamber is critical. However it has been found that a longer chamber provides greater volume and correspondingly greater amounts of gas can be burned providing greater energy output.

Fibers of glass produced by the present burner are different from those produced by flame attenuation as heretofore practiced.

Prior fibers have been of extremely short length, due probably to the fact that the extremely high velocity of the prior blasts, compared with the temperature, "burns off" or severs the attenuated fibers from the primary filaments before the attenuated fibers can attain appreciable length. Thus fibers heretofore produced have, for example, in the one micron diameter range been of a length of only about 1/16 to about 3/16 of an inch. These fibers have also been straight and thus do not adhere tenaciously to each other when in mat form. This is evidenced by the fact that prior mats have displayed low tensile strength and integrity.

The present fibers differ from prior fibers in two respects:

(1) The fibers are long.
(2) They are undulatory, or wave-like.

As to the length of the fibers, depending upon their diameter, they range in average length from about one-half inch upwards. Those of a length of several inches have been produced. It is not uncommon to produce, by the present burner, utilizing primary filaments of about 0.003 inch diameter, attenuated fibers of an average length of about one-half inch and having a diameter of 1.0 micron.

As to the configuration of the fibers, whereby they are adhered together, which is also a function of length, they can be described as undulatory or wave-like, or sinuous.

Average fiber diameters in the range from 1.0 to 10.0 microns can be produced, depending upon the size and rate of feed of the primary filaments.

Generally primary filaments of a diameter in the range from 0.003 to 0.020 inch are suitable.

A further characteristic of the fibers produced by the present invention is that they are generally quite free of shot. Shot can be defined as small spheres of glass which are formed by remelting of the ends of the fine fibers after they are attenuated. This factor correlates with long fiber length. Since the present fibers are longer, as described above, it follows that there are fewer fiber "burn-offs" and accordingly less shot.

The reason why the fibers are long and of undulatory character is not exactly known. However, it is believed that the temperature of the gaseous blast is higher in proportion to the velocity, thus allowing greater attenuation over a longer attenuation period. Thus it is probable that the velocity is not so violent and the flame is more stable so as not to tear the fibers into short lengths.

It is therefore believed that a gaseous blast of unique characteristics is provided. That is, a gaseous blast of high temperature and only relatively high velocity is provided.

It has also been observed that some actual combustion takes place after the gases have exhausted from the outlet port of the burner. This may be a factor contributing to long fiber length and undulatory fiber character. It may be that a longer attenuation zone is thereby provided which is effective to keep the fibers molten for a period of time for great attenuation. This also may be effective to provide the undulatory or wave-like character to the fibers.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A process for producing glass fibers comprising the steps of:
    (a) injecting a pressurized stream of combustion air into a refractory lined combustion space of elongated and free flow configuration;
    (b) inspirating a volume of combustible fuel with said presurized stream greater than that which will produce complete combustion with the air of said stream;
    (c) intermingling said fuel and said air in said combustion space and partially burning the resultant admixture to produce a turbulent blast having a temperature exceeding the melting temperature of the glass to be attenuated; and
    (d) introducing a source of glass material into the burning gases of said blast in a zone wherein the heat transfer to the glass is sufficiently great to melt the glass material at a rate greater than the rate of attenuation produced by the velocity of the blast and thereby form the glass material into long fibers before said fibers are severed from said source.

2. The process as described in claim 1, which further comprises completing combustion of the partially burning gases outside of said combustion space.

3. The process as described in claim 1, which further comprises inducing flow of additional combustion air with said pressurized stream into the entrance of said combustion space.

4. The process as described in claim 1, which further comprises recirculating a portion of the gases produced by the combustion within said combustion space from the exit end thereof to a point adjacent the point of injection of said pressurized stream and said combustible fuel, and burning said combustible fuel in an admixture with said recirculated gases and said primary air.

5. A method of producing glass fibers comprising the steps of:
    (a) directing a pressurized stream of air into the entrance of an open refractory tunnel with sufficient velocity to induce a flow of combustible fuel into the tunnel at a rate where the volume of fuel in regard to the volume of air is greater than that which will result in complete combustion of said fuel in said tunnel;
    (b) igniting the combustible admixture so that initial combustion occurs with a deficiency of air;
    (c) substantially completing combustion to form a blast having a temperature exceeding the melting temperature of the glass to be attenuated and having a velocity sufficient to attenuate the melted glass into fibers; and
    (d) advancing a glass rod having a diameter in the range of .003–.020 inch into the zone where combustion is being substantially completed to melt the rod and attenuate fibers therefrom having diameters in the range of from 1.0–10.0 microns and having an average length greater than ½ inch.

6. A method of producing glass fibers from a source of glass material that can be attenuated into fibers when softened by heat which comprises:
    (a) injecting as a high velocity stream a component of a combustible mixture into a refractory tunnel of elongated and free flow configuration;
    (b) inspirating a second component of said combustible mixture with said stream and permitting said components to intermix sideways through said tunnel to form said combustible mixture;
    (c) partially burning said mixture in said refractory tunnel while advancing said mixture in free flow pattern thereby providing a turbulent stream;
    (d) discharging the partially burnt mixture from the tunnel and completing combustion adjacent the tunnel exit;
    (e) introducing glass material into the zone where combustion is being completed and wherein the heat transfer to the glass is sufficiently great to soften the glass material at a rate greater than the rate of attenuation produced by the velocity of the turbulent mixture discharged from the tunnel and thereby form the glass material into long fibers before the same are severed from the glass material.

7. A method of forming a high velocity and high temperature gaseous blast comprising the steps of:
    (a) injecting a pressurized stream of combustion air into a refractory lined combustion space of elongated and free flow configuration;
    (b) inspirating a volume of combustible fuel with said pressurized stream greater than that which will produce complete combustion with the air of said stream;
    (c) intermingling said fuel and said air in said combustion space and partially burning the resultant mixture to produce a turbulent blast; and
    (d) completing combustion of the partially burning gases outside of said combustion space.

8. A method of forming a high velocity and high temperature gaseous blast comprising the steps of:
    (a) injecting a pressurized stream of combustion air into a refractory lined combustion space of elongated and free flow configuration;
    (b) inspirating a volume of combustible fuel with said pressurized stream;

(c) partially burning the resultant admixture in said combustion space while advancing the burning admixture in a free flow pattern wherein the admixture diverges in a first direction transverse to the direction of advancing movement and converges in a second direction transverse to the direction of advancing movement.

References Cited in the file of this patent

UNITED STATES PATENTS

| | | |
|---|---|---|
| 316,059 | Randol | Apr. 21, 1885 |
| 1,634,533 | Breese | July 5, 1927 |
| 2,011,283 | Huff | Aug. 13, 1935 |
| 2,059,523 | Hepburn et al. | Nov. 3, 1936 |
| 2,153,951 | Barber | Apr. 11, 1939 |
| 2,162,432 | Hillhorese | June 13, 1939 |
| 2,458,543 | Urquhart | Jan. 11, 1949 |
| 2,498,162 | Heller et al. | Feb. 21, 1950 |
| 2,510,888 | Hill et al. | June 6, 1950 |
| 2,554,486 | Austin | May 29, 1951 |
| 2,612,679 | Ladisch | Oct. 7, 1952 |
| 2,663,906 | Labino | Dec. 29, 1953 |
| 2,674,025 | Ladisch | Apr. 6, 1954 |
| 2,692,220 | Labino | Oct. 19, 1954 |
| 2,822,579 | Silverman | Feb. 11, 1958 |